United States Patent [19]
Murai et al.

[11] Patent Number: 6,115,093
[45] Date of Patent: Sep. 5, 2000

[54] LIQUID CRYSTAL DISPLAY DEVICE HAVING AT LEAST TWO MICRO AREAS OF LIQUID CRYSTAL LAYER CAPABLE OF BEING BUILT UP FROM A CENTER OF EACH PIXEL

[75] Inventors: Hideya Murai; Teruaki Suzuki; Masayoshi Suzuki, all of Tokyo, Japan

[73] Assignee: NEC Corporation, Tokyo, Japan

[21] Appl. No.: 09/049,059

[22] Filed: Mar. 27, 1998

[30] Foreign Application Priority Data

Mar. 31, 1997 [JP] Japan ..................... 9-079344

[51] Int. Cl.⁷ ............... G02F 1/1337; G02F 1/1343
[52] U.S. Cl. .............................. 349/129; 349/143
[58] Field of Search ..................... 349/129, 143

[56] References Cited

U.S. PATENT DOCUMENTS

| 5,309,264 | 5/1994 | Lien et al. | 359/87 |
| 5,479,282 | 12/1995 | Toko et al. | 359/75 |
| 5,831,700 | 11/1998 | Li et al. | 349/88 |
| 5,953,092 | 9/1999 | Sung et al. | 349/143 |
| 5,959,707 | 9/1999 | Murai et al. | 349/129 |

FOREIGN PATENT DOCUMENTS

| 63-106624 | 5/1988 | Japan . |
| 6-118426 | 4/1994 | Japan . |
| 6-194657 | 7/1994 | Japan . |
| 7-225389 | 8/1995 | Japan . |
| 7-230097 | 8/1995 | Japan . |
| 8-114818 | 5/1996 | Japan . |
| 9-22025 | 1/1997 | Japan . |
| 9-146098 | 6/1997 | Japan . |
| 10-20323 | 1/1998 | Japan . |
| 10-133209 | 5/1998 | Japan . |
| 10-186366 | 7/1998 | Japan . |

*Primary Examiner*—William L. Sikes
*Assistant Examiner*—Heidi L. Eisenhut
*Attorney, Agent, or Firm*—McGinn & Gibb, P.C.

[57] ABSTRACT

To provide a liquid crystal display device easily produced having no disclination which causes a light leak, an excellent visual angle and an excellent contrast ratio, a liquid crystal layer is interposed between two substrates, two or more of micro areas coexist with each other in the liquid crystal layer, and liquid crystal molecules in the micro areas build up from a center of each pixel. A potential of a second electrode disposed on an opening is made approximately identical with that of a counter electrode, and a potential of a peripheral electrode is higher than that of the counter electrode, thereby obtaining the liquid crystal display device in which the liquid crystal molecules build up from the center of each pixel. Thus, the liquid crystal display device easily produced having a wide visual angle and an excellent contrast ratio is obtained. In addition, a polymer organic compound is dispersed in the liquid crystal to fix a built up direction of the liquid crystal molecules.

22 Claims, 5 Drawing Sheets

LIQUID CRYSTAL DISPLAY DEVICE HAVING AT LEAST TWO MICRO AREAS OF LIQUID CRYSTAL LAYER CAPABLE OF BEING BUILT UP FROM A CENTER OF EACH PIXEL

BACKGROUND OF THE INVENTION

The present invention relates to a liquid crystal display device for displaying characters, figures or the like, and particularly to a liquid crystal display device easily manufactured having an excellent visual angle property and an excellent contrast ratio.

In a conventional twisted nematic (hereinafter referred to as "TN") type liquid crystal display device widely used, electrodes are disposed between two opposing substrates and liquid crystal molecules are disposed in the electrodes. The liquid crystal display device displays "white" in which the liquid crystal molecules are parallel to a surface of the substrates when applying no voltage. Once the voltage is applied thereto, the "white" display gradually changes to a "black" display as a result of the liquid crystal molecules changing their directors or orientation vectors to an electric field in accordance with the applied voltage. Such built up behavior of the liquid crystal molecules when applying the voltage makes the visual angle of the TN type liquid crystal display device narrow.

Japanese Unexamined Patent Publication No. 63-106624 (hereinafter referred to as "related art 1") discloses, for example, a method for improving the visual angle property of the TN type liquid crystal display device. According to the related art 1, one pixel has orthogonal rubbing directions with each other in two opposing glass substrates and is divided into plural areas, of a first area and a second area having different rubbing directions from each other. Built up directions of the liquid crystal molecules are made opposite to each other in the first area and in the second area, thereby improving the visual angle. However, the related art 1 divides the pixel into plural areas of the first and the second areas having different rubbing directions from each other by the use of a micro rubbing technique, which leads to an increase in steps.

Japanese Unexamined Patent Publication No. 10-20323 filed by the present inventors (hereinafter referred to as related art 2) discloses a liquid crystal display device which divides each pixel into four areas having different twist directions and built up directions of the liquid crystal from one another by utilizing a nonuniform electric field. According to the liquid crystal display device of the related art 2, a high voltage is applied to a second electrode where a liquid crystal polymer is disposed on an opening of a first electrode on a rear surface of a substrate via an orientation film to lower a voltage of the first electrode therearound, whereby the nonuniform electrical field is produced between the opposing substrates. The nonuniform electrical field divides each pixel into four to build up the liquid crystal molecules therearound.

However, in the liquid crystal display device of the related art 2, a direction of the nonuniform electrical field in producing a divided structure is different from that in displaying an image. Therefore, when displaying the image, the liquid crystal molecules build up in an opposite direction to that in producing the divided structure. At a boundary of the divided structure, disclination is produced which causes a light leak and lowers a contrast.

In the liquid crystal display device of the related art 2, the first electrode configuring a peripheral electrode is a set of a gate electrode and a drain electrode. A potential of such electrodes is not identical (=0V) with that of a counter electrode opposite to the first electrode when displaying the image. Accordingly, the disclination occurs in the divided structure produced where the potential of the first electrode is 0V and the potential of the second electrode is high, because the electrical field in displaying the image is different from that in producing the divided structure.

SUMMARY OF THE INVENTION

It is an object of the present invention to provide a liquid crystal display device having a wide visual angle and a high contrast with no tone reversal.

According to the present invention, there is provided a liquid crystal display device composed of two substrates, and a liquid crystal layer of liquid crystal molecules interposed between the two substrates, and two or more of micro areas which coexist with each other in the liquid crystal layer and which define a pixel, the liquid crystal display device being structured so that the liquid crystal molecules in the micro areas build up from a center of each pixel.

In the liquid crystal display device of the present invention, it is preferred to have at least one of structures including that:

(1) the micro areas coexisting with each other include two different micro areas where the liquid crystal molecules have identical twist directions in vectors and have different built up directions, (2) the micro areas coexisting with one another include four different micro areas where the liquid crystal molecules have a different twist direction in the vectors and have a different built up direction in each pixel, (3) a first electrode having an opening on at least one of the two substrates is disposed or a second electrode is disposed at the opening, (4) a first electrode is disposed at at least one substrate of the two substrates and the second electrode which is insulated from the first electrode is disposed on the first electrode, (5) the opening or the second electrode has a parallel portion on a diagonal of each pixel or of longitudinal line of each pixel, (6) the liquid crystal includes a high molecule organic compound, and (7) the organic compound is obtained by reacting a monomer or a oligomer with the liquid crystal.

According to the liquid crystal display device of the present invention, the liquid crystal molecules build up from the center of the pixel as described above, and the electrical field used in dividing each of the pixels into four and the electrical field occurring in displaying the image are approximately of an identical level. Consequently, even when displaying the image, the liquid crystal molecules do not build up from an opposite direction. Therefore, a disclination causing light leakage is not produced.

Thus, the liquid crystal display device of the present invention has not only an excellent visual angle, but also an excellent contrast ratio.

DESCRIPTION OF THE PREFERRED EMBODIMENTS

Before explaining the preferred embodiments of the present invention, the liquid crystal display device of the related arts 1 and 2 will be described with reference to FIGS. 1 and 2 for a better appreciation of the present invention.

Figure 1:
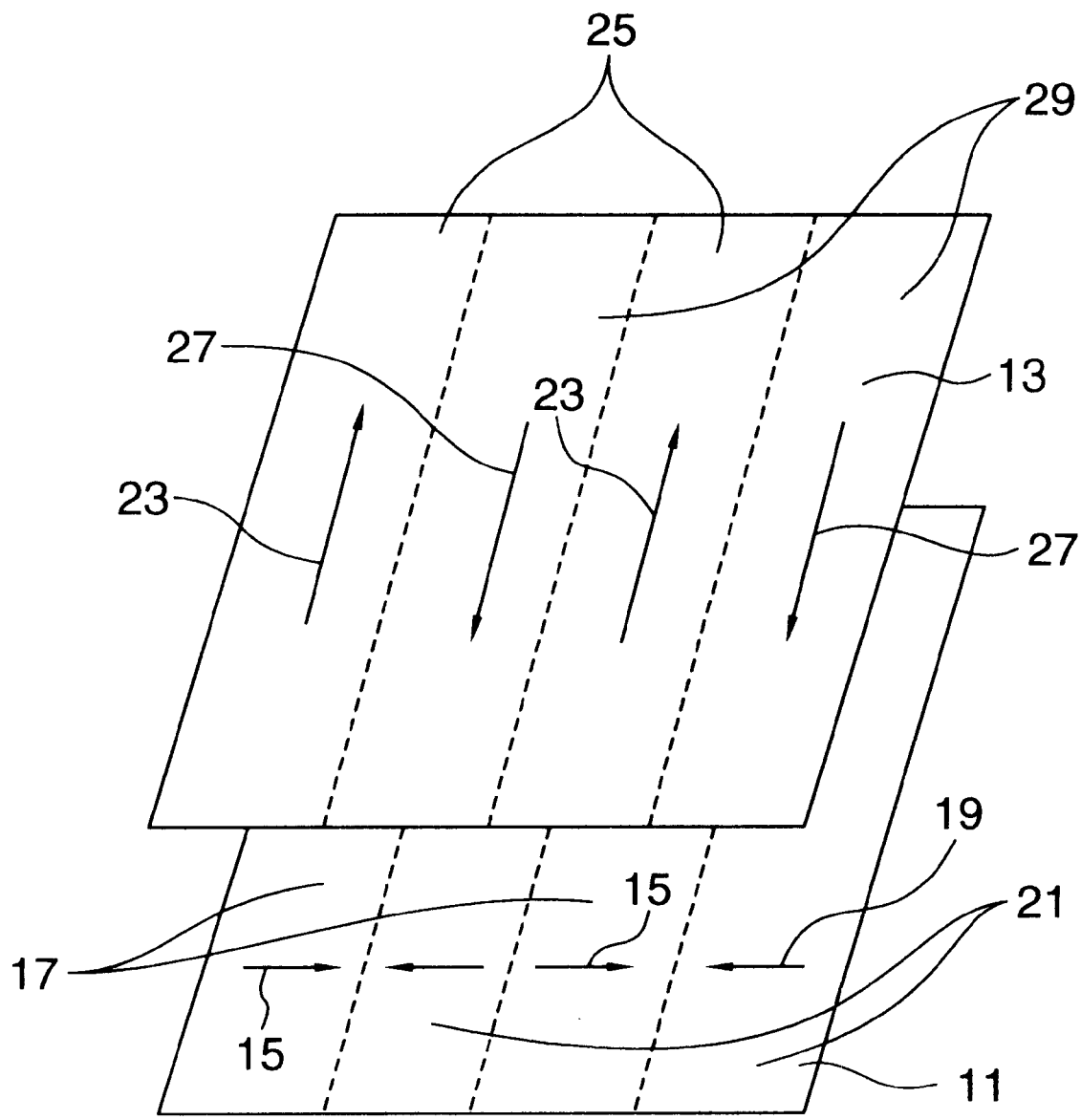
FIG. 1 is a schematic perspective view showing a rubbing direction in a liquid crystal panel for use in explaining the TN type liquid crystal display device of the related art 1.

Referring to FIG. 1, the TN type liquid crystal display device of the related art 1 comprises a first glass substrate 11 and a second glass substrate 13 opposite to each other. The first glass substrate 11 includes a first area 17 whose rubbing direction is indicated by a right-directed arrow 15 and a second area 21 whose rubbing direction is indicated by a left-directed arrow 19.

The second glass substrate 13 includes a first area 25 whose rubbing direction is indicated by a backward-directed arrow 23 and a second area 29 whose rubbing direction is indicated by a forward-directed arrow 27. In the related art 1 shown in FIG. 1, one pixel is divided into two portions of the first area 17, 25 and the second area 21, 29 which have different rubbing directions per pixel, and built up directions of the liquid crystal molecules are made opposite to each other, thereby improving the visual angle. However, in the related art 1, the pixel is divided into the first area 17, 25 and the second area 21, 29 which have different rubbing directions per pixel to each other by the use of the micro rubbing technique. Therefore, an increase in steps is not avoided with the micro rubbing technique.

Figure 2:
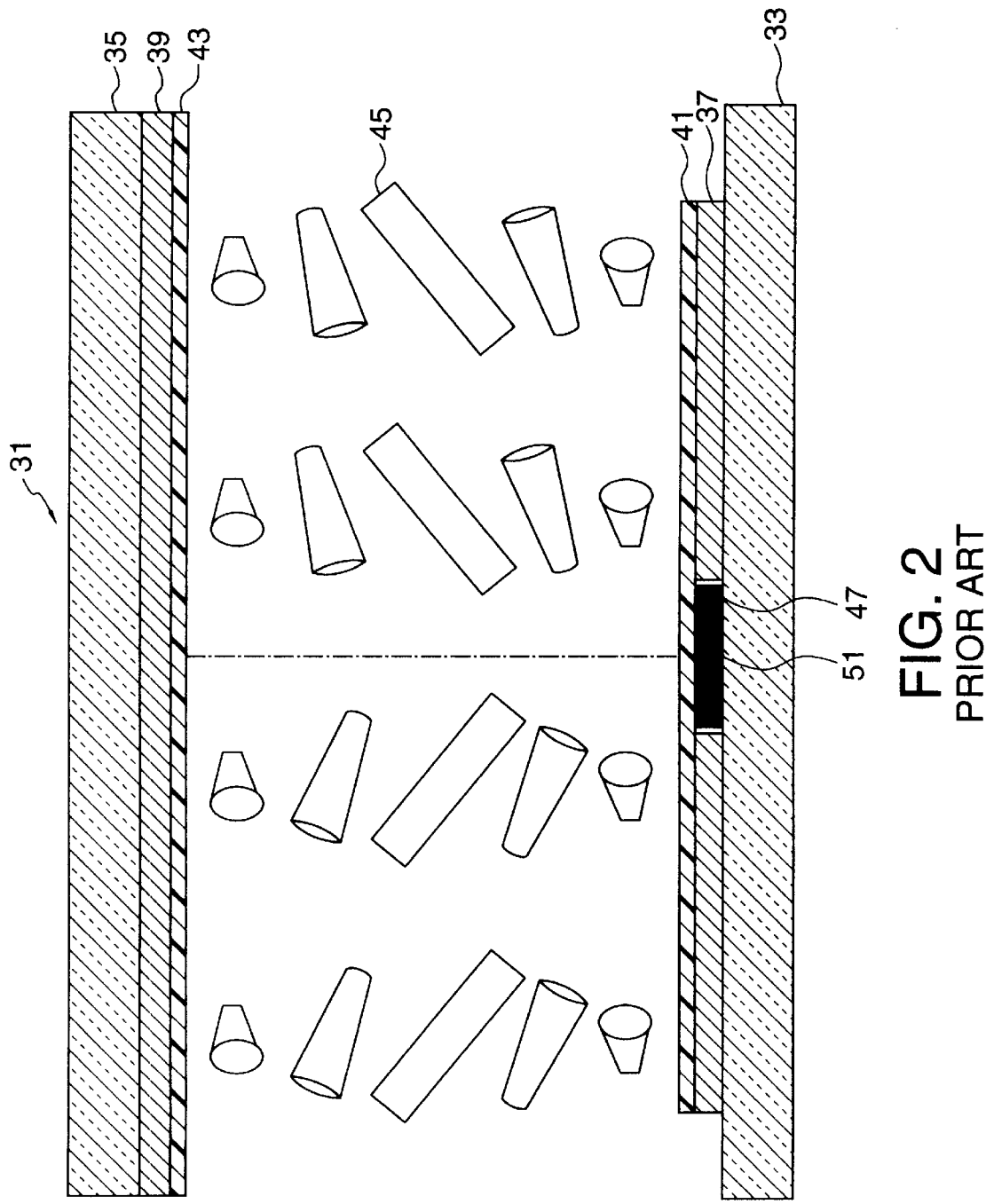
FIG. 2 is a sectional view of the liquid crystal display device of the related art 2.

Referring to FIG. 2, the liquid crystal display device 31 of the related art 2 has a pair of substrates composed of a first substrate 33 and a second substrate 35 opposite to each other, a first electrode 37 disposed on the first substrate 33, a counter electrode 39 disposed on the second substrate 35 opposite to the first electrode 37, a first orientation film 41 disposed on the first electrode 37, and a second orientation film 43 disposed on the counter electrode 39 opposite to the first orientation film 41. Liquid crystal molecules 45 are interposed between the first orientation film 41 and the second orientation film 43. An opening 47 is disposed at the first electrode 37. A second electrode 51 is disposed on the opening 47. In the liquid crystal display device 31, a high potential is applied to the second electrode 51 disposed on the opening 47 to lower a potential of the first electrode 37 which is a peripheral electrode of the second electrode 51, thereby producing a nonuniform electrical field between the first substrate 33 and the second substrate 35. As a result, the liquid crystal molecules 45 in each pixel is controlled to be built up around the nonuniform electrical field as shown in FIG. 2 to divide each pixel into four.

However, a direction of the nonuniform electrical field for producing the divided structure is different from that of a nonuniform electrical field for displaying the image. Therefore, the liquid crystal molecules 45 build up partially at an opposite direction to that when producing the divided structure. Disclination is produced at an interface thereof to leak light, thereby lowering contrast.

In the liquid crystal display device 31 of the related art 2, the first electrode 37 configures the peripheral electrode and is a set of a gate electrode and a drain electrode. A potential of the set of electrodes do not be identical (=0V) with that of the counter electrode when displaying the image. Accordingly, the disclination occurs in the divided structure produced where the potential of the first electrode 37 is 0V and the potential of the second electrode 51 is high because the electrical field in displaying the image is different from that in producing the divided structure.

Now, preferred embodiments of the present invention will be described with reference to FIGS. 3 to 5. In the preferred embodiment of the present invention, the similar parts are designated by like reference numerals as described in connection with FIGS. 1 and 2.

Figure 3:
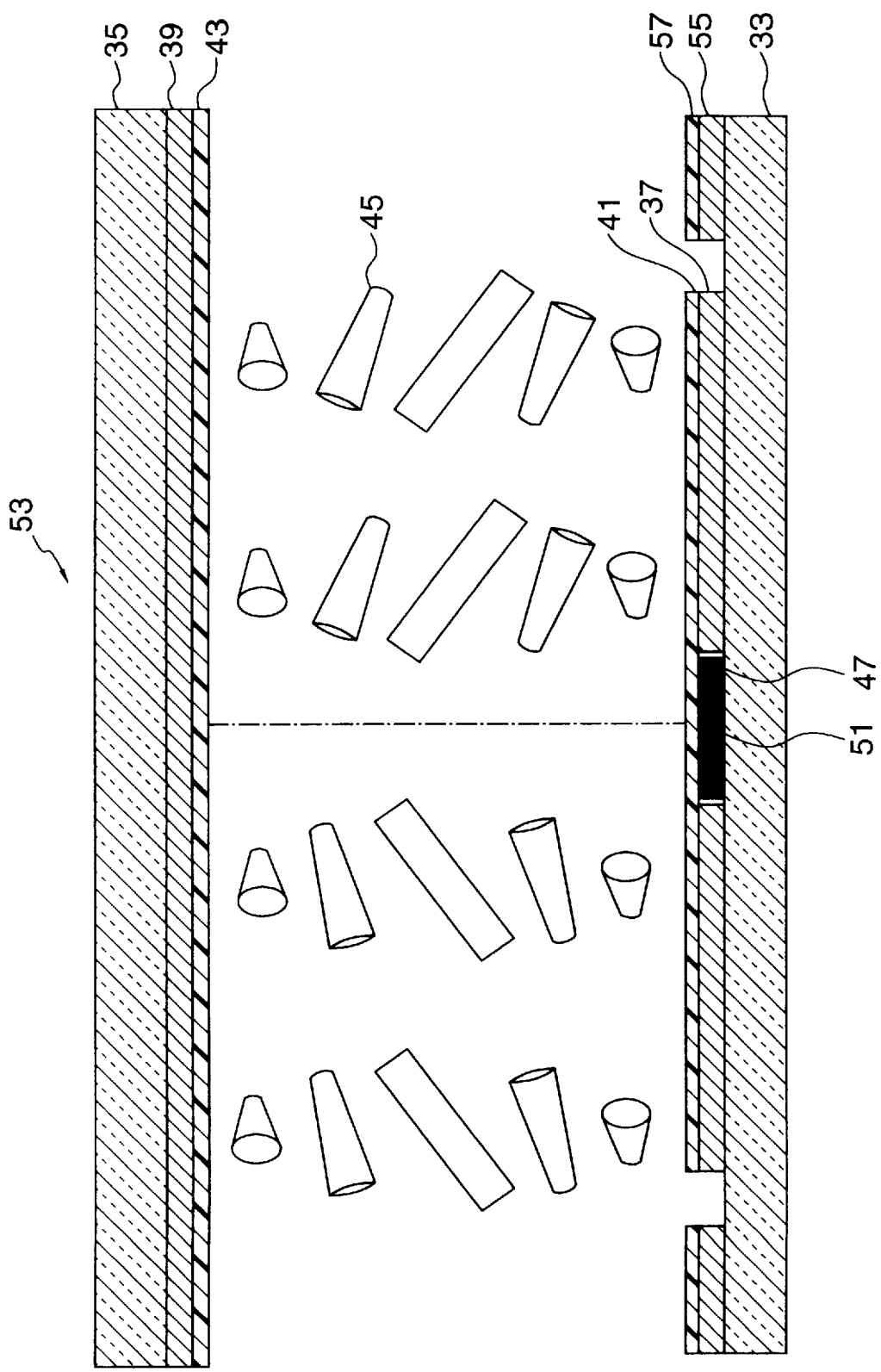
FIG. 3 is a sectional view of the liquid crystal display device according to the embodiment of to the present invention.

Referring to FIG. 3, the TN type liquid crystal display device 53 according to one embodiment of the present invention is composed of a first substrate 33 having a first electrode 37 and a peripheral electrode 55, a second substrate 35 having a counter electrode 39, and a layer including liquid crystal molecules 45 interposed between the first substrate 33 and the second substrate 35. The first electrode 37 is typically a pixel electrode composed of a transference electrode, such as ITO (Indium Tin Oxide) or the like. The peripheral electrode 55 is an electrode, such as a gate line, a drain line or the like. In FIG. 3, a first orientation film 41, a second orientation film 43 and a peripheral orientation film 57 are shown to exhibit a state of an orientation control in the liquid crystal. However, the first and the second orientation films 41, 43 and the peripheral orientation film 57 may not be disposed.

In the liquid crystal display device 53 according to the embodiment of the present invention, an opening 47 is disposed at the first electrode 37 on the first substrate 33. A second electrode 51 is disposed at the identical position. The first electrode 37 and the second electrode 51 are insulated and different voltages are applied thereto. Further, in the liquid crystal display device 53, polarization films are disposed at both ends of a cell but are not shown in FIG. 3.

In the liquid crystal display device 53, the first substrate 33 and the second substrate 35 are oriented so as to twist the liquid crystal molecules 45 left an angle of about 90° between the first and second substrates 33, 35. The liquid crystal molecules 45 are oriented in parallel between the first and second substrates 33, 35 when applying no voltage. Once a voltage is, however, applied between the counter electrode 39 and the first electrode 37, the liquid crystal molecules 45 are shifted, their orientation being toward an electrical field direction. Then, a variation is made of an amount of light which is transmitted through the liquid crystal display device 53.

On the other hand, the conventional liquid crystal display device includes no opening 47 and no second electrode 51. In the liquid crystal molecules, built up directions are therefore determined, for example, by a pretilt angle determined by the first orientation film 41, the second orientation film 43 and a rubbing direction.

In contrast, the liquid crystal display device according to one embodiment of the present invention has the second electrode 51 other than the first electrode 37 which is the pixel electrode as shown in FIG. 3. When a voltage is applied to the second electrode 51, which is different from that applied to the first electrode 37, a nonuniform electrical field is produced in the liquid crystal layer. In addition, when an adequate voltage is applied to the peripheral electrode 55, the liquid crystal molecules 45 in one pixel build up from a center of the pixel as shown in FIG. 3. This, realization is made of the pixel divided type liquid crystal display device 53.

For producing an electrical field to divide the pixel in such direction, a potential of the peripheral electrode 55 is to be different from that of the counter electrode 39; for example, potential are to be dentical of the second electrode and the counter electrode 39 and a potential of the peripheral electrode 55 is to be higher than that of the counter electrode 39.

In the liquid crystal display device 53 according to one embodiment of the present invention, the liquid crystal molecules 45 build up from a different direction due to the nonuniform electrical field, i.e. from the center of one pixel. With such liquid crystal molecules 45, the visual angle property is improved. Moreover, a direction of the electrical field used for making the molecular structure is approximate to that of the nonuniform electrical filed when displaying the image. Therefore, no disclination which causes a light leak occurs to produce the liquid crystal display device having a high contrast when displaying the image. because.

The second electrode 51 can be produced with identical layers as conductive materials for forming matrix elements of a TFT or the like. In this case, the second electrode 51 can be produced only by changing a photoresist mask. As a result, the liquid crystal display device according to one embodiment of the present invention can be advantageously manufactured without increasing steps in comparison with a method of manufacturing the conventional liquid crystal display device.

The liquid crystal display device according to one embodiment of the present invention will be further described below.

According to the liquid crystal display device of one embodiment in the present invention, a liquid crystal layer is interposed between two substrates, two or more of micro areas coexist in the liquid crystal display device and liquid crystal molecules in these micro areas build up from a center of each pixel. The micro areas of the present invention is for improving the visual angle property in the TN. Therefore, a size of the micro area is need to be almost identical with or greater than that of the pixel. However, a shape of the micro area is not necessarily identical to that of the pixel. Moreover, a boundary of the micro areas is not necessarily straight, and may be a random shape divided by a curve or the like.

In the present invention, "build up from the center of each pixel" refers to "the liquid molecules build up from the center of the pixel when applying a voltage."

Typically, a gate line electrode and a drain electrode are disposed on the first substrate 33 in the TN type liquid crystal display device as shown in FIG. 3. Therefore, the above-described built up definition is applicable. However, the gate line electrode and the drain electrode may be disposed on the second electrode 35 being different from the conventional structure. In this case, the liquid crystal molecules build up oppositely.

Example of the liquid crystal layer of the liquid crystal display device according to one embodiment of the present invention will be described for detail. As shown in FIG. 3, two types of micro areas exist. In two or more of the micro areas, the liquid crystal molecules have an identical twist direction in vectors and have different built up directions. In other words, only two, three, or four micro areas may exist. In case of the four micro areas, the liquid crystal molecules have different twist directions in vectors and built up directions in each area. It is required that these four micro areas coexist with one another in one pixel. Their shapes, positions and the like are not especially limited in the present invention. Each micro area may be equally divided into polygon, or randomly divided by a curve.

In the liquid crystal display device of the present invention in which the liquid crystal molecules in the micro areas build up from the center of each pixel, it is preferred that the opening is disposed on any of electrodes, the opening is disposed on any of electrodes and a second electrode is disposed on the opening, or a second electrode is disposed on a electrode which is insulated from the second electrode.

Above-mentioned structures will be described for detail referring again to FIG. 3. In the liquid crystal display device according to the embodiment of the present invention, the opening 47 or the second electrode 51 has enough size to build up the liquid crystal molecules from the center of each pixel, concretely a few or less micro meters ($\mu$m).

The size of the opening 47 is not necessarily equal to that of the second electrode 51. The opening 47 may be greater or smaller than the second electrode 51.

In the present invention, the second electrode is disposed at a position of the opening, which means that the opening 47 and the second electrode 51 are approximately at the identical position and overlapped when viewing from a front of the liquid crystal display device according to the embodiment of the present invention and which does not means that the opening 47 is at the identical position as the electrode 51 when viewing a cross-section of the liquid crystal display device according to the embodiment of the present invention.

In the liquid crystal display device according to the embodiment of the present invention, the opening 47 and the second electrode 51 may be the identical layer or may be different layers either of which is near at the front. Both cases are involved in the present invention.

In case of applying the liquid crystal display device according to the embodiment of the present invention to a TFT driven liquid crystal display device, the TFT driven liquid crystal display device can be produced by the use of entirely different layers from any TFT layer, but is preferably produced by the use of the identical layer as the TFT layer. This is because no additional step is needed by producing by the use of the identical layer to obtain the liquid crystal display device according to the embodiment of the present invention. In a preferred embodiment, the second electrode 51 is produced with a chromium layer configuring the gate electrode layer and a photoresist process is applied simultaneously.

In case of using the liquid crystal display device according to the embodiment of the present invention as the TFT driven liquid crystal display device, the TFT may have a staggered structure or an inverted staggered structure and the second electrode 51 may be the identical layer as any of TFT layers or may be newly formed apart.

In liquid crystal display device according to the embodiment of the present invention, the opening 47 and the second electrode 51 exist desirably on a diagonal of each pixel. For example, in case of the second electrode 51 is in an X shape, one pixel is divided into four along the diagonal thereof, thereby obtaining the liquid crystal display device having a wide visual angle. The diagonal is not need to be exact diagonal and may be deformed more or less only if the diagonal almost equally divides one pixel.

Figure 4:
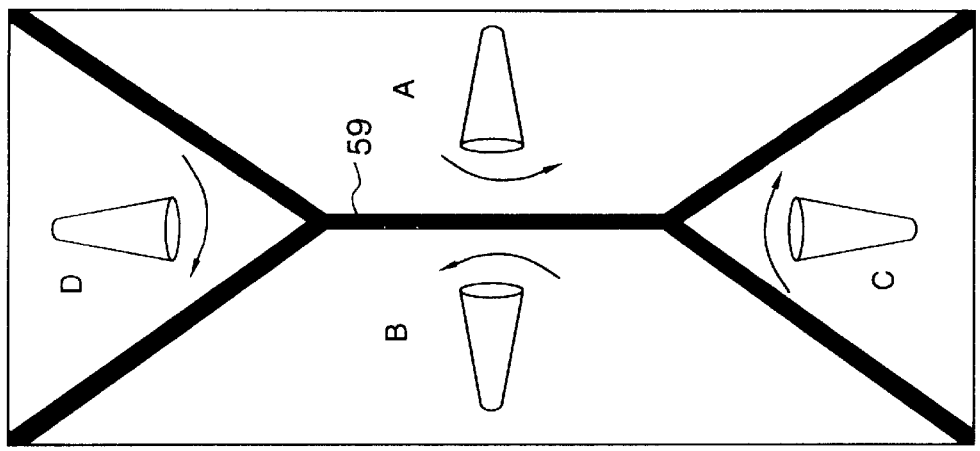
FIG. 4 is an enlarged sectional view showing one example of the liquid crystal display device of FIG. 3.

Referring to FIG. 4, an example of the liquid crystal layer of the liquid crystal display device of FIG. 3 is shown in an enlarged view. In the liquid crystal display device, four types of almost triangular-shaped micro areas, i.e. an area A, an area B, an area C, and an area D, in which the liquid crystal molecules has the different twist directions in vectors and built up directions, coexist with one another in one pixel as shown in FIG. 4.

A further advantage of the liquid crystal display device according to the embodiment of the present invention is that the area A and the area B, and the area C and the area D, all of which are the micro areas, in which the liquid crystal molecules have an identical twist direction and different built up directions, are contact not at a line with each other but only at a point as viewed from an upper surface. As a result, the liquid crystal display device according to the embodiment of the present invention can achieve a high contrast without disposing a special light filtering layer.

At a boundary portion 53 of the area A and the area B, and the area C and the area D in which the liquid crystal molecules have the identical twist direction and the different built up directions as shown in FIG. 4 by arrows, the liquid crystal molecules at the boundary portion 53 cannot be moved when applying the voltage and remain in a state of transmitting light when applying no voltage.

On the other hand, the liquid crystal molecules have different twist directions at one part of the boundary portion of the area A and the area C, and the other parts of the boundary portion of the area B and the area D, and have no continuous 90 degree twist. Accordingly, linear polarized light is not rotary polarized. The liquid crystal molecules do not always transmit light, either.

Consequently, in the liquid crystal display device according to the embodiment of the present invention, each first pair of the area A and the area C, and the area B and the area D are contacted at a line. IN the first pair, the crystal liquid molecules have different twist directions from each other. Each second pair of the area A and the area B and the area C and the area D are contacted at a point. In the second pair, the liquid crystal molecules have different built up directions from each other. Therefore, the liquid crystal display device achieve the high contrast without disposing the special light filtering layer.

Typically, in the liquid crystal color display device, three pixels of R, B and G coexist therein with one another, which together enable a polychrome display.

The R, B and G pixels are not square and are rectangle having, for example, an aspect ratio of 3:1, and form together a square pixel unit.

In this case, the built up directions are easily controlled of the liquid crystal molecules in a short horizontal direction, but are somewhat difficult to control in a long vertical direction.

For example, the area C and the area D are less stable than the area A and the area B. For producing the four micro areas A, B, C, and D equally, conditions are thus limited of applying voltage and a cooling speed.

In other embodiment of the liquid crystal display device according to the present invention, such limitation is further released to be capable of dividing into four areas easily and stably under a wide range of the voltage applying condition and the cooling condition. The opening 47 or the second electrode 51 has a portion in parallel with a longer side of the pixel in the other embodiment of the liquid crystal display device. Various examples of enlarged views of the liquid crystal display device having such second electrode 51 are shown in FIGS. 5 to 7.

Figure 5:
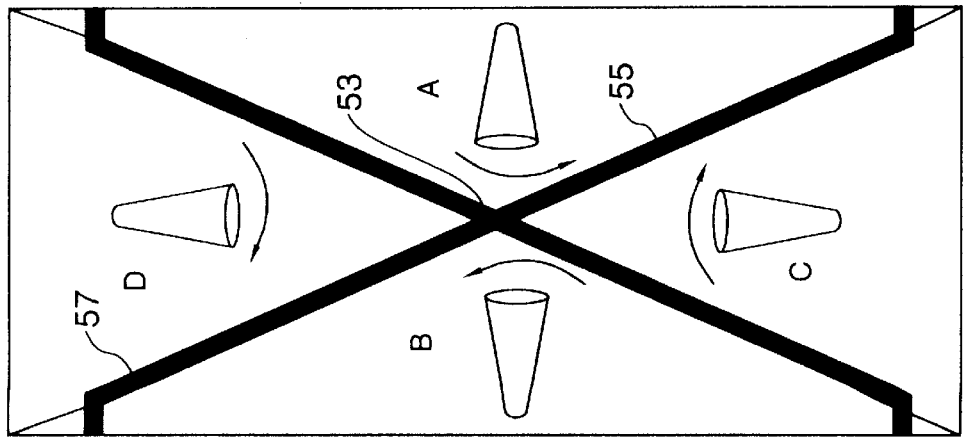
FIG. 5 is an enlarged sectional view showing another example of the liquid crystal display device of FIG. 3.
Figure 7:
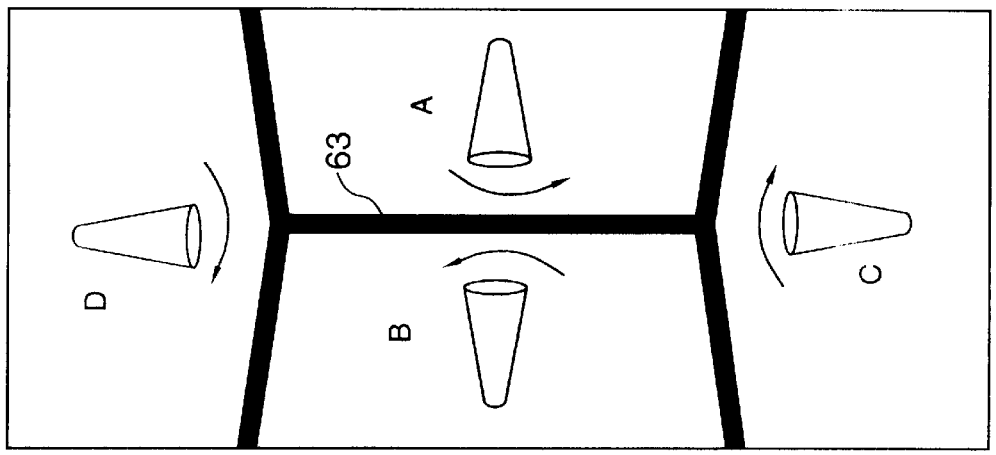
FIG. 7 is an enlarged sectional view showing yet another example of the liquid crystal display device of FIG. 3.
Figure 6:
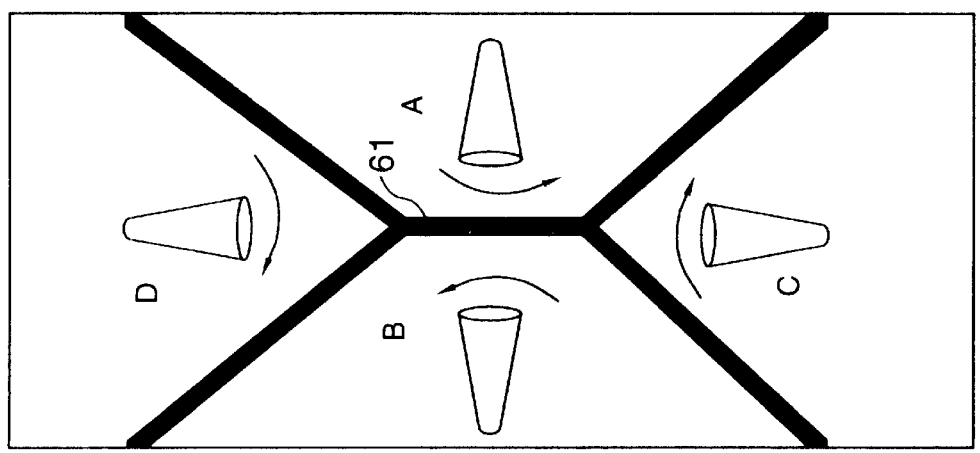
FIG. 6 is an enlarged sectional view showing still another example of the liquid crystal display device of FIG. 3.

In comparing electrode shapes shown in FIGS. 5 to 7 with the electrode shape shown in FIG. 4, lengths of the area C and the area D are shorter in FIGS. 5 to 7, whereby the area C and the area D are produced more stably and easily to obtain exact four divisions under the wide range of the voltage applying condition and the cooling condition.

In FIGS. 5 to 7, the area A and the area B are contacted at a line 59, 61 or 63. It seems that light leaked from the contact point to lower a contrast of the liquid crystal display device.

However, in the liquid crystal display device according to the embodiment of the present invention, the areas having different twist directions are produced preferentially over the areas having identical twist directions. The area C and the area D are produced in a string-like shape at the boundary 59, 61 or 63 of the area A and the area B in FIGS. 5 to 7. Therefore, the contrast of the liquid crystal display device is not lowered.

In the liquid crystal display device 53 shown in FIG. 3, the liquid crystal molecules 45 have a positive anisotropy of dielectric constant and their initial orientations are parallel with the first and second substrates 33 and 35. However, the liquid crystal display device according to the embodiment of the present invention is not limited thereto. The anisotropy of dielectric constant of the liquid crystal molecules 45 may be negative and the initial orientations of the liquid crystal molecules 45 may be homeotropic orientations perpendicular to the first and second substrates 33 and 35.

Materials of the liquid crystal is not necessarily the TN type having the twist angle of 90° and may be a super twisted TN (STN) type or may have ferroelectricity.

Next, description will be made as regards a method for producing the liquid crystal display device according to the embodiment of the present invention.

Various methods are applied to produce the liquid crystal display device according to the embodiment of the present invention. For example, the liquid crystal display device is produced by (A) heating a liquid crystal layer isotropically and then cooling, or produced (B) at room temperature without heating isotropically.

In the method (A) for heating isotropically, a liquid crystal is injected into the liquid crystal panel, heated at a temperature or more of an isotropic phase—liquid crystal layer transition temperature and then cooled from the transition temperature or more to the transition temperature or less. When cooling, a potential of the second electrode and a potential of the counter electrode are made approximately identical, and the potential of the second electrode and a potential of the peripheral electrode are made different.

The voltage is applied in cooling from the isotropic phase—liquid crystal layer transition temperature or more as described above, thereby producing a divided structure where the liquid molecules 45 build up from the center of each pixel as shown in FIG. 3.

The liquid crystal display device according to the embodiment of the present invention is produced at room temperature without heating isotropically (B) as described above.

In this method, firstly a higher voltage than a normal driven voltage of the liquid crystal is applied to build up the liquid crystal molecules along a nonuniform electrical field, thereby driven the liquid crystal.

To ensure storing the directions of the liquid crystal molecules, the liquid crystal may include a small amount of a high molecular organic compound.

The high molecular compound is especially preferred which is obtained by injecting the liquid crystal including a monomer or an oligomer between the substrates and by reacting the monomer or oligomer in the liquid crystal to polymerize because the high molecular compound is distributed uniformly and the built up directions of the liquid crystal molecules are stabilized.

In the method of producing the liquid crystal display device according to the present invention, the monomer or the oligomer in the liquid crystal may be reacted in (i) an isotropic phase, (ii) a liquid crystal layer, or (iii) both of the isotropic phase and the liquid crystal layer to make polymers.

In the method for reacting the monomer or the oligomer in the isotropic phase, the polymer produced generally help the areas where the liquid crystal molecules have the different twist directions and built up directions to stably exist. On the other hand, in the method for reacting the monomer or the oligomer in the liquid crystal layer, it seems that the polymer produced tend to store positively the orientation of the liquid crystal. However, such difference is not apparent. The liquid crystal display device of the present invention is obtained by reacting the monomer or the oligomer using either of methods.

In the monomer or the oligomer used in the present invention, use is made of a photo-curing monomer, a thermosetting monomer or an oligomer thereof and other components other than such monomer or oligomer may be added thereto. The photo-curing monomer or oligomer used in the present invention is not only cured by visible light but also cured by ultraviolet light, which is called an ultraviolet light-curing monomer. For an easy operation, the latter is especially preferred.

The polymer compound used in the present invention may have a similar structure to the liquid crystal molecules including the monomer or the oligomer exhibiting a liquid crystal property, but may have a flexible structure including an alkylene chain, because the polymer compound is not necessarily used for a purpose of orienting the liquid crystal.

The monomer may be monofuntional or poly-functional, such as bifunctional, trifunctional or more or the like.

Examples of the photo-curing monomer and the ultraviolet light-curing monomer of the present invention include a monofunctional acrylate compound, such as 2-ethylhexyl acrylate, butylethyl acrylate, butoxyethyl acrylate, 2-cyanoethyl acrylate, benzyl acrylate, cyclohexyl acrylate, N,N-ethylaminoethyl acrylate, 2-hydroxypropyl acrylate, 2-ethocyethyl acrylate, N,N-dimethylaminoethyl acrylate, dicyclopentanyl acrylate, dicyclopentenyl acrylate, glycidyl acrylate, tetrahydro-furfuryl acrylate, isobonyl acrylate, isodecyl acrylate, lauryl acrylate, morpholine acrylate, phenoxyethyl acrylate, phenoxydiethyleneglycol acrylate, 2,2,2-trifluoroethyl acrylate, 2,2,3,3,3-pentafluoropropyl acrylate, 2,2,3,3-tetrafluoropropyl acrylate, 2,2,3,4,4,4-hexafluorobutyl acrylate and the like.

A monofunctional metacrylate compound such as 2-ethylhexyl metacrylate, butylethyl metacrylate, butoxyethyl metacrylate, 2-cyanoethyl metacrylate, benzyl metacrylate, cyclohexyl metacrylate, 2-hydroxypropyl metacrylate, 2-ethoxyethyl metacrylate, N,N-diethylaminoethyl metacrylate, N,N-dimethylaminoethyl metacrylate, dicyclopentanyl metacrylate, dicyclopentenyl metacrylate, glycidyl metacrylate, tetrahydrofurfuryl metacrylate, isobonyl metacrylate, isodecyl metacrylate, lauryl metacrylate, morpholine metacrylate, phenoxyethyl metacrylate, phenoxydiethyleneglycol metacrylate, 2,2,2-trifluoroethyl metacrylate, 2,2,3,3,3-tetrafluoropropyl metacrylate, 2,2,3,4,4,4-hexafluorobutyl metacrylate and the like can be used.

A polyfunctional acrylate compound such as 4,4'-biphenyl diacrylate, diethylstilbestrol diacrylate, 1,4-bisacryloyloxy benzene, 4,4'-bisacryloyloxydiphenyl ether, 4,4'-bisacryloyloxydiphenyl methane, 3,9-bis[1,1-dimethyl-2-acryloyloxyethyl]-2,4,8,10-tetraspiro[5,5]undecane, α,α'-bis[4-acryloyloxyphenyl]-1,4-diisopropyl benzene, 1,4-bisacryloyloxytetrafluoro benzene, 4,4'-bisacryloyloxyoctafluoro biphenyl, diethyleneglycol diacrylate, 1,4-butane diol diacrylate, 1,3-butyleneglycol diacrylate, dicyclopentanyl diacrylate, glycelol diacrylate, 1,6-hexane diol diacrylate, neopentylglycol diacrylate, tetraethyleneglycol diacrylate, trimethylolpropane triacrylate, pentaerythritol tetraacrylate, pentaerythritol triacrylate, ditrimethylolpropane tetraacrylate, dipentaerythritol hexaacrylate, dipentaerythritolmonohydroxy pentaacrylate, 4,4'-diacryloyloxy stilbene, 4,4'-diacryloyloxy dimethylstilbene, 4,4'-diacryloyloxy diethylstilbene, 4,4'-diacryloyloxy dipropylstilbene, 4,4'-diacryloyloxy dibutylstilbene, 4,4'-diacryloyloxy dipentylstilbene, 4,4'-diacryloyloxy dihexylstilbene, 4,4'-diacryloyloxy difluorostilbene, 2,2,3,3,4,4-hexafluoropentane diol-1,5-diacrylate, 1,1,2,2,3,3-hexafluoropropyl-1,3-diacrylate, urethane acrylate oligomer and the like can be used.

A polyfunctional metacrylate compound such as diethyleneglycol dimetacrylate, 1,4-butane diol dimetacrylate, 1,3-butyleneglycol dimetacrylate, dicyclopentanyl dimetacrylate, glycelol dimetacrylate, 1,6-hexane diol dimetacrylate, neopentylglycol dimetacrylate, tetraethyleneglycol dimetacrylate, trimethylolpropane trimetacrylate, pentaerythritol tetrametacrylate, pentaerythritol trimetacrylate, ditrimethylolpropane tetrametacrylate, dipentaerythritol hexametacrylate, dipentaerythritolemonohydroxy pentametacrylate, 2,2,3,3,4,4-hexafluoropentane diol-1,5-dimetacrylate, urethane metacrylate oligomer and the like; styrene; aminostylene; vinyl acetate and the like can be used, but not limited thereto.

The driven voltage of the device in the present invention is affected by an interface interaction between the polymer material and the liquid crystal material. Therefore, the polymer compound of the present invention may include a fluorine element. Examples of such polymer compound include a polymer compound synthesized using 2,2,3,3,4,4-hexafluoropentane diol-1,5-diacrylate, 1,1,2,2,3,3-hexafluoropropyl-1,3-diacrylate, 2,2,2-trifluoroethyl acrylate, 2,2,3,3-pentafluoropropyl acrylate, 2,2,3,3-tetrafluoropropyl acrylate, 2,2,3,4,4,4-hexafluorobutyl acrylate, 2,2,2-trifluoroethyl metacrylate, 2,2,3,3-tetrafluoropropyl metacrylate, 2,2,3,4,4,4-hexafluorobutyl metacrylate, urethane acrylate oligomer and the like, but not limited thereto.

In case of using the photo-curing monomer or the ultraviolet curing monomer as the polymer compound in the present invention, a photoinitiator or an ultraviolet light initiator can be used.

Examples of the initiators include an acetophenone type initiator such as 2,2-diethoxyacetophenone, 2-hydroxy-2-methyl-1-phenyl-1-on, 1-(4-isopropyl phenyl)-2-hydroxy-2-methylpropane-1-on, 1-(4-dodecyl phenyl)-2-hydroxy-2-methylpropane-1-on and the like; a benzoin type initiator such as benzoin methylether, benzoin ethylether, benzyldimethyl ketal; a benzophenone type initiator such as benzophenone, benzoyl benzoic acid, 4-phenyl benzophenone, 3,3-dimethyl-4-methoxy benzophenone; a thioxanthone type initiator such as thioxanthone, 2-chlorthioxanthone, 2-methylthioxanthone; a diazonium salt type initiator; a sulfonium salt type initiator; an iodonium salt type initiator; a selenium salt type initiator and the like.

Examples and Comparative Examples of producing the liquid crystal display device according to the present invention will be described. The present invention, however, is not limited thereto. Various modifications and alternations can be made without departing from the scope of the invention.

EXAMPLE 1

Amorphous silicon thin film transistor (TFT) array, in which one pixel size was 100 μm×300 μm, a total number of pixels was 480×640×3 and a diagonal size of a display was 240 mm, were formed on a glass substrate by repeating a film accumulating process and a lithography process.

The TFT of Example 1 had an inverted staggered structure, and was constituted by the substrate, a gate chromium layer on the substrate, a silicon nitride insulating layer on the gate layer, an amorphous silicon semiconductor layer on the insulating layer, a drain and source chromium layer on the semiconductor layer, and a pixel ITO layer on the semiconductor layer.

On each pixel electrode ITO produced, an opening had an X shape with 5 mm wide in a diagonal direction and was formed to produce a chromium electrode having an X shape conformed to the opening. The electrode was designed to be capable of applying a voltage externally which was different from that applied to the pixel. The electrode was made of chromium which is identical material with the gate electrode. Therefore, no additional process was required comparing with the conventional production process.

For a counter substrate in the liquid crystal panel of Example 1, use was made of an RGB color filter substrate. After cleaning the substrate, orientation films 41, 43, and 57 (as shown in FIG. 3), consisting of polyimide orientating agent "JALS-428 (manufactured by Nippon Gosei Gomu Co., Ltd.)", were coated with a spin coater and were baked or burnt at 90° C. and 220° C.

A buff cloth made of rayon was used to rub the substrates in diagonal directions. Each rubbing direction was kept at an angle of 90° on an upper substrate and a lower substrate.

An adhesive agent was applied to peripheral portions of the substrates and 6 μm-diameter latex balls were then sprayed as spacers thereinto. Both substrates were aligned, pressed and stuck together.

The stuck substrates were disposed in a vacuum chamber. After degassing the vacuum chamber, nematic liquid crystal "ZLI4792 (manufactured by Merck Co., Ltd.)" was introduced. Two polarized films were stuck to the liquid crystal panel in an orthogonal mode so that polarization axes of the polarized films were vertical to the rubbing direction of each substrate to form the liquid crystal display device.

As a reference to the counter electrode, a voltage of 0V was applied to the electrode having the X shape of the liquid crystal display device to conduct displaying normally. A voltage for a pixel display was about 5V.

No tone reversal was observed in any direction. The liquid crystal display device was obtained which had a wide visual angle with no roughness from a vertical direction.

A state of each pixel was monitored using a microscope when applying the voltage. Each pixel was divided into the four areas; A, B, C and D as shown in FIG. 2. Observation of the substrates tilted under applying the voltage found that these four areas have different twist directions and built up directions.

A visual angle property when displaying a tone was measured at intervals of a azimuth of 45 degree using a liquid crystal evaluation apparatus "LCD-5000" (trade name). As a result, almost identical visual angle property was obtained to all directions and no tone reversal was recognized within 60 degree.

No disclination which causes a light leak when driving was recognized and a contrast was 100:1 or more.

Comparative Example 1

The liquid crystal display device was produced and driven as Example 1 except that a voltage of 10V, which was a reference to the counter electrode, was applied to the electrode having the X shape. In accordance with the liquid crystal display device in Comparative Example 1, a contrast of about 30:1 was obtained. When monitoring the cell with the microscope, white disclination was observed at an end of each pixel.

EXAMPLE 2

The panel was produced in the similar manner described in Example 1 except that a TFT had a staggered structure. Amorphous silicon thin film transistor (TFT) array, in which one pixel size was 100 μm×300 μm, a total number of pixels was 480×640×3 and a diagonal size of a display was 240 mm, were formed on a glass substrate by repeating a film accumulating process and a lithography process.

The TFT of Example 2 had the staggered structure, and was constituted by the substrate, a pixel ITO layer on the substrate, a source and drain chromium layer on the ITO layer, an amorphous silicon semiconductor layer on the source and drain layer, a silicon nitride insulating layer on the semiconductor layer, and a gate chromium layer film on the insulating layer.

On each pixel electrode ITO produced, an opening having an X shape with 5 mm wide in a diagonal direction was formed to produce a chromium electrode having an X shape conformed to the opening. The electrode was designed to be capable of applying a voltage externally which was different from that applied to the pixel. The electrode was made of chromium which is identical material with the gate electrode. Therefore, no additional process was required comparing with the conventional production process.

In Example 2, the panel was built up in the similar manner described in Example 1 and liquid crystal was injected thereinto to produce the liquid crystal display device. As a reference to the counter electrode, a voltage of 0V was applied to the electrode having the X shape of the liquid crystal display device for a normal display. A voltage for a pixel display was about 5V.

In Example 2, no tone reversal was observed in any direction as Example 1. The liquid crystal display device had a high contrast.

EXAMPLE 3

The TFT substrate was produced in the similar manner described in Example 1 and the panel was produced in combination with the color filter substrate. The stuck substrates were disposed in a vacuum chamber. After degassing the vacuum chamber, a liquid crystal solution was introduced which consists nematic liquid crystal "ZLI4792 (manufactured by Merck Co., Ltd.; a phase transition temperature: 92° C.)" and 0.2 wt % of an ultraviolet-curing monomer "KAYARADTMPTA (manufactured by Nippon Kayaku Co., Ltd.).

The panel was then heated to 110° C. and an ultraviolet ray (0.1 mW/cm2) was irradiated thereto for 30 minutes at 110° C. Thereafter, while a sine wave voltage of 0V and 5

Hz was applied to the electrode having the X shape and a sine wave voltage of 5V and 5 Hz was applied to the pixel, the substrates were cooled at 20° C./minute.

When obtained cells were monitored with a polarization microscope, each section was divided into four micro areas in accordance with the electrode having the X shape. It was found by a change in brightness when tilting the cells that the four micro areas have built up directions as shown in FIG. 4.

Applying the voltage to the electrode having the X shape of the liquid crystal display device was stopped to conduct displaying normally. Even though in a half tone, an excellent display was obtained which had a wide visual angle and a high contrast without a tone reversal was obtained.

When monitoring the cell with the microscope, the liquid crystal was divided into four areas in accordance with a position of the electrode having the X shape. No disclination, which causes a light leak was recognized in each pixel. A visual angle property was measured during displaying a tone at intervals of a azimuth of 45 degree using a liquid crystal evaluation apparatus "LCD-5000" (trade name). As a result, almost identical visual angle property was obtained to all directions and no tone reversal was recognized within 60 degree.

EXAMPLE 4

In the similar manner as described in Example 1, the substrates were formed of amorphous silicon thin film transistor (TFT) array on a glass substrate by repeating a film accumulating process and a lithography process. In the array, one pixel size was 100 $\mu$m×300 $\mu$m, a total number of pixels was 480×640×3 and a diagonal size of a display was 240 mm. No opening was formed on the ITO of each pixel electrode.

Each pixel was overlaid with a nitride film which is an insulating film and the electrode having the X shape made of chromium was produced on a center of each pixel. The electrode was designed to be capable of applying a voltage externally which is different from that applied to the pixel. As a counter electrode of the liquid crystal panel, the RGB color filter substrate was used.

These substrates were stuck together as mentioned in Example 1 to produce the liquid crystal display device as mentioned in Example 3.

When obtained cells were monitored with the polarization microscope, each section was divided into four micro areas in accordance with the electrode having the X shape. It was found by a change in brightness when tilting the cells that the four micro areas had built up directions as shown in FIG. 4.

The liquid crystal display device was stopped applying the voltage to the electrode having the X shape to conduct displaying normally. Even though in a half tone, an excellent display was obtained which had a wide visual angle without a tone reversal.

When monitoring the cell with the microscope, the liquid crystal was divided into four areas in accordance with a position of the electrode having the X shape and the liquid crystal was built up from a center of the pixel.

In displaying a tone, a visual angle property was measured at intervals of a azimuth of 45 degree using a liquid crystal evaluation apparatus "LCD-5000" (trade name). As a result, almost identical visual angle property was obtained to all directions and no tone reversal was recognized within 60 degree.

No disclination was recognized which causes a light leak when driving and a contrast was 100:1 or more.

EXAMPLE 5

The panel was produced in the similar manner described in Example 3 except that the electrode having the shape of FIG. 3 was used as the second electrode shape. A voltage was applied to a peripheral electrode of the panel, which was changed from 50V to 20V. A cooling speed of the substrates was changed from 5° C./minute to 20° C./minute. A divided state was then monitored. Under any condition, the four divisions were obtained in accordance with the electrode shape. No tone reversal was recognized within 60 degree.

No disclination was recognized which causes a light leak when driving and a contrast was 100:1 or more.

EXAMPLE 6

A device was produced in the similar manner described in Example 3 except that the opening was formed only in a diagonal direction and no chromium electrode was formed. A potential of 20V was only applied between the counter electrode and the peripheral electrode when cooling to produce a divided structure.

When monitoring a cell with the microscope, the liquid crystal was divided into four areas in accordance with a position of the electrode having the X shape and the liquid crystal was also built up from a center of the pixel.

No disclination was recognized which causes a light leak when driving and a contrast was 100:1 or more.

As described above, according to the liquid crystal display device of the present invention, in which a liquid crystal layer is interposed between two substrates and two or more of micro areas coexist with one another in the liquid crystal layer, liquid crystal molecules in the micro areas build up from a center of each pixel. There is no reversal tone at a wide visual angle and no disclination which causes a light leak. Therefore, the liquid crystal display device can be advantageously provided with a high contrast.

What is claimed is:

1. A liquid crystal display device comprising two substrates, a liquid crystal layer of liquid crystal molecules interposed between said two substrates, and two or more micro areas which coexist in said liquid crystal layer and which define a pixel, said liquid crystal display device being structured so that said liquid crystal molecules in said micro areas build up from a center of each pixel, and simultaneously rearrange to turn each inner portion toward one substrate presented in each tilted-up direction of said liquid crystal molecules.

2. The liquid crystal display device according to claim 1, wherein said two or more micro areas coexisting in each of said pixels include two micro areas where said liquid crystal molecules have an identical twist direction in vectors and have different built up directions from each other.

3. The liquid crystal display device according to claim 1, wherein said two or more micro areas coexisting in each pixel include four micro areas where said liquid crystal molecules have an identical twist direction in vectors and have different built up directions from one another.

4. The liquid crystal display device according to claim 1, wherein at least one substrate of the two substrates has a first electrode disposed with an opening on a surface.

5. The liquid crystal display device according to claim 2, wherein at least one substrate of the two substrates comprises a first electrode disposed on said surface with an opening and a second electrode disposed at a position of said opening.

6. The liquid crystal display device according to claim 1, wherein at least one substrate of the two substrates has a first electrode disposed on a surface, said first electrode having a second electrode which is insulated from said first electrode and disposed on said first electrode.

7. The liquid crystal display device according to claim 4, wherein said opening is disposed on a diagonal of each pixel.

8. The liquid crystal display device according to claim 4, wherein said opening has a parallel portion with a longitudinal line of each pixel.

9. The liquid crystal display device according to claim 8, wherein said micro areas are four, two of said four micro areas being not adjacent to each other built respectively including two solid angles of each pixel.

10. The liquid crystal display device according to claim 1, wherein said liquid crystal layer includes a high molecular compound.

11. The liquid crystal display device according to claim 10, wherein said high molecular compound is produced from a reaction of a monomer or an oligomer in said liquid crystal.

12. The liquid crystal display device according to claim 11, wherein one of the two substrates comprises a glass substrate.

13. The liquid crystal display device according to claim 12, wherein said glass substrate includes an orientation film via said first electrode or a counter electrode on a surface opposite to one of the other substrate.

14. The liquid crystal display device according to claim 12, further including a thin film transistor (TFT) having an inverted staggered structure or a staggered structure on said glass substrate.

15. The liquid crystal display device according to claim 12, wherein the other substrate of the two substrates comprises a color filter substrate.

16. The liquid crystal display device according to claim 5, wherein said at least one substrate has a peripheral electrode disposed around said first electrode, said peripheral electrode being a gate line or a drain line.

17. The liquid crystal display device according to claim 16, wherein said first electrode is formed on one substrate of the two substrates, said second electrode is formed on said opening, and said peripheral electrode is formed around said first electrode, said liquid crystal display device further comprising a counter electrode formed on the other substrate of the two substrates, wherein said second electrode and said counter electrode have identical potential and said peripheral electrode and said counter electrode have different potentials to build up from a center of said pixel divided into a plurality of micro areas.

18. The liquid crystal display device according to claim 17, wherein a different voltage is applied between said first electrode and said counter electrode from that applied between said second electrode and said counter electrode and a desired voltage is applied to said peripheral electrode to build up from a center of the pixel divided into a plurality of micro areas.

19. The liquid crystal display device according to claim 5, wherein at least one of said opening and said second electrode is disposed on a diagonal of each pixel.

20. The liquid crystal display device according to claim 6, wherein said second electrode is disposed on a diagonal of each pixel.

21. The liquid crystal display device according to claim 5, wherein at least one of said opening and said second electrode has a parallel portion with a longitudinal line of each pixel.

22. The liquid crystal display device according to claim 6, where in said second electrode has a parallel portion with a longitudinal line of each pixel.

* * * * *